United States Patent [19]

Tunkel et al.

[11] Patent Number: 5,749,231
[45] Date of Patent: May 12, 1998

[54] NON-FREEZING VORTEX TUBE

[75] Inventors: Lev Tunkel, Edison, N.J.; Boris Krasovitski, Nesher, Israel; Rorbert L. Foster, Manasquan, N.J.

[73] Assignee: Universal Vortex, Inc., Robbinsville, N.J.

[21] Appl. No.: 699,778

[22] Filed: Aug. 13, 1996

[51] Int. Cl.[6] ........................ F25B 9/02
[52] U.S. Cl. ........................ 62/5; 29/890.035
[58] Field of Search ............... 62/5; 29/890.035

[56] References Cited

U.S. PATENT DOCUMENTS 1,952,281   3/1934   Ramque ........................ 62/5
3,296,807   1/1967   Fekete ........................ 62/5
5,327,728   7/1994   Tunkel ........................ 62/5

*Primary Examiner*—Ronald C. Capossela
*Attorney, Agent, or Firm*—McAulay Fisher Nissen Goldberg & Kiel, LLP

[57] ABSTRACT

A design of a non-freezing vortex tube to operate with non-dried even wet inlet gas flow in a broad range of a vortex tube's cold fraction value, the non-freezing vortex tube includes a heat exchanger and a vortex tube comprising a slender tube, a diaphragm having a hole in the center thereof and closing one end of the slender tube, one or more tangential nozzles piercing the slender tube just inside the diaphragm and a throttle valve on the other end of the slender tube, the design comprising ways of connecting the non-freezing vortex tube to keep all diaphragm's surfaces above the point of freezing.

23 Claims, 4 Drawing Sheets

A NON FREEZING VORTEX TUBE ASSEMBLY, 10

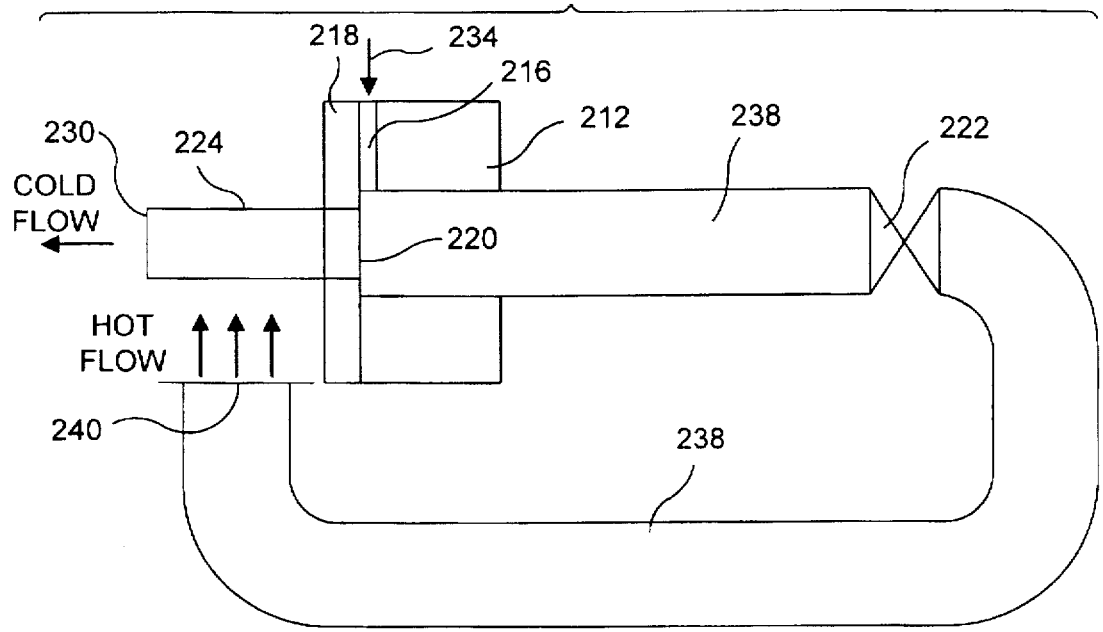
F I G. 5
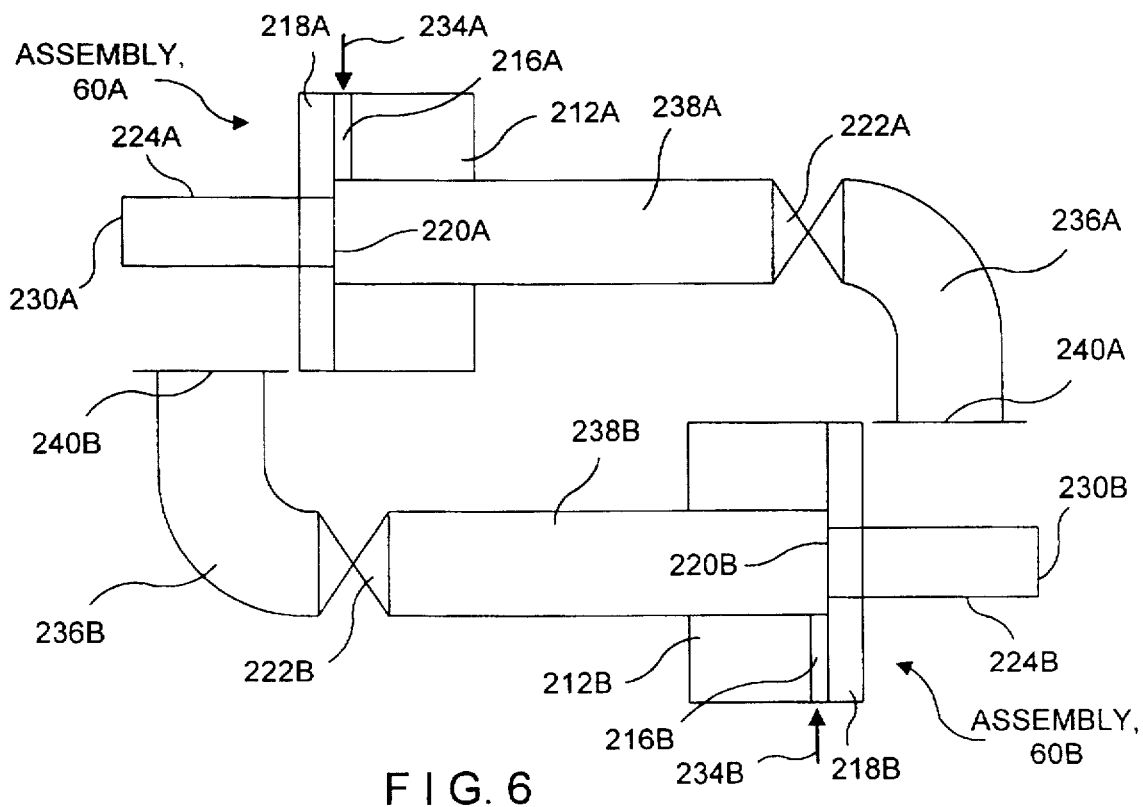
F I G. 6

5,749,231

NON-FREEZING VORTEX TUBE

BACKGROUND OF THE INVENTION

1. Field of the Invention

This invention is concerned with vortex tubes. More particularly, the present invention relates to a manufacture using a method of a vortex tube design which provides a vortex tube having a high efficiency by elimination of any freeze up during operation.

2. Description of Prior Art

It is known to use a vortex tube for energy separation when the vortex tube us fed with a compressible fluid under a positive (i.e., above atmospheric) pressure. Such a method is harnessed in a system and comprises a source of the compressed fluid connected with a vortex tube. In a vortex tube, the initial flow is transformed into two separate currents of a different energy (a cold and a hot fraction) leaving the vortex tube separately under pressure which is less than the inlet pressure but at a pressure still above atmospheric.

A vortex tube comprises a slender tube with a diaphragm closing one end of the tube provided with a hole in the center of the diaphragm for discharge of the cold fraction, one or more tangential inlet nozzles piercing the tube just inside of the diaphragm, and a controlled hot fraction discharge opening such as a throttle valve or any other restrictive body at the far end or the other end of the slender tube.

Even today, the full theory of the vortex tube, explaining all its features, has not yet been created or established. However, the principal mechanism of the vortex phenomenon can be described in the following manner. An expanding gas after passing the tangential nozzle develops into a high speed rotating body (a vortex). The gas in the vortex is cooled because part of its total energy converts into kinetic energy. An angular velocity in the vortex is low at the periphery zones reduces all of the gas to the same angular velocity as in a solid body. This causes the inner layers to slow down and the outer layers to speed up. As a results, the inner layers lose part of their kinetic energy and their total temperature decreases. The periphery layers receive the energy from the internal layers. This energy converts to heat through friction in the "hot" end of the tube.

In a vortex tube's chilled central layers, a condensation of a feed's saturated vapor or vapors quite often takes place. In general, a condensed liquid in the form of drops under influence of a swirling flow's high centrifugal forces are forced to the vortex tube periphery and then, being mixed up with a hot flow, leave the vortex tube through a controlled discharge opening.

However, if a vortex tube's mode of operation calls for a relatively large volume of a cold fraction, for example, in order to obtain the larger cooling duty, the flow which goes through the vortex tube's diaphragm hole includes not only a vortex tube's chilled and dried central layers but also some relatively less chilled peripheral layers which may contain the liquid droplets.

This entrapped liquid which typically is water, could begin to freeze at the cold diaphragm surfaces causing the diaphragm hole to decrease and, accordingly, cause a severe deterioration of the vortex tube's performance.

In a case when the inlet gas flow already carries some liquid (this is, for instance, quite typical for the compressed air), a presence of the original water drops results in an even faster development of the above mentioned situation.

In order to operate a vortex tube in a desirable range of it's cold fraction value, a contemporary's vortex tube feed requires a special treatment; liquid separation/filtration and drying to the dew point sufficient to avoid a vapor condensation inside of the vortex tube.

SUMMARY OF THE INVENTION

To this end, the present invention consists of the provision of a manufacture in a vortex tube design which eliminates freeze ups during the vortex tube's operations within the conventional, broad range of cold fraction value with non-dried even non-separated or wet feedstock.

This is achieved by applying the vortex tube's hot fraction flow to the outward side of the vortex tube's diaphragm in order to keep all diaphragm's surfaces above the point of freezing.

For the sake of simplicity in the use of terms, the term "throttle" will be used hereinafter in a broad sense to define a controlled hot fraction discharge opening, a restrictive body or a throttle valve.

The vortex tube's diaphragm hole is associated with a heat exchanger's inlet opening for receiving a cold fraction and, a vortex tube's diaphragm outward surface and the heat exchanger's inner passage external surface, and a passage external surface are equipped with one or more of a plurality of supplemental surfaces.

BRIEF DESCRIPTION OF THE DRAWINGS

FIG. 5 is a schematic design and flow diagram of another embodiment of the invention;

FIG. 6 is a schematic design and flow diagram of another embodiment of the invention.

DETAILED DESCRIPTION OF THE PREFERRED EMBODIMENTS

Figure 1:
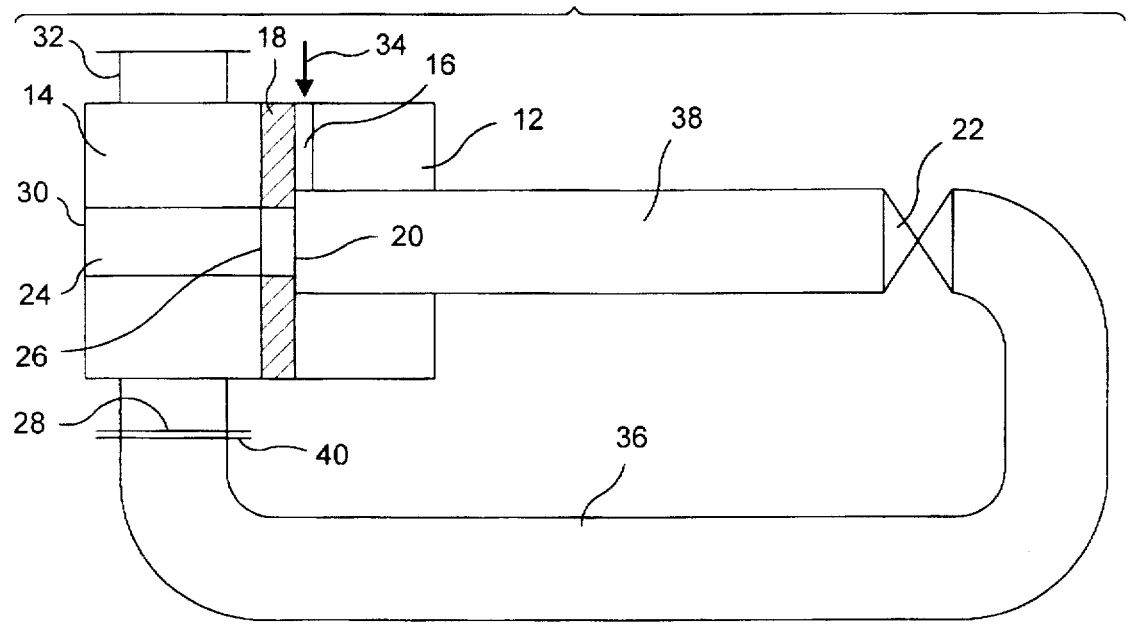
FIG. 1 is a schematic design and flow diagram of one embodiment according to the invention.

Referring now more particularly to the accompanying drawings and in particular to the schematic design and flow diagram of FIG. 1 which illustrates one embodiment of the invention, a non-freezing vortex tube assembly 10 according to invention includes a vortex tube 12 provided with an inlet nozzle 16, a diaphragm 18 provided with a central hole 20 and a throttle 22 at the far end of slender tube 38, and a heat exchanger 14 provided with an inner passage 24, two inlet openings 26 and 28 and two outlet openings 30 and 32. Openings 26 and 30 also serve as inner passage's 24 inlet and outlet.

Slender tube 38, central hole 20, inlet opening 26 and outlet opening 30 are preferably coaxial and axially aligned along a first common axis. Inlet opening 28 and outlet opening 32 are preferably coaxial and aligned along a second common axis which is transverse and a preferably orthogonal to the first common axis. However, these two axes while shown in an orthogonal relationship to each other can be at an angular relationship to each other, although not shown for the sake of simplicity.

A gas flow in the direction of arrow 34 enters assembly 10 through the vortex tube's nozzles 16 and then undergoes an energy (temperature) separation, forming a cold and hot fraction.

A cold fraction is discharged from the vortex tube 12 through diaphragm hole 20 and enters into a heat exchanger 14 through the heat exchanger inlet opening 26, then goes through inner passage 24 in the heat exchanger and leaves or exits from the heat exchanger 14 through it's outlet opening 30. A hot fraction is discharged from throttle 22 and is then directed through line 36 and its outlet 40, and enters into heat exchanger 14 through inlet opening 28, and goes towards the outlet opening 32 simultaneously flowing over the surfaces on the inside of the heat exchanger and then leaves or exits from the heat exchanger through outlet opening 32.

The function of heat exchanger 14 is to maintain the vortex tube's diaphragm surface temperature above freezing. This is achieved by maintaining the vortex tube's hot fraction energy transfer to the diaphragm in order to compensate for a diaphragm's surface chilling by the vortex tube's cold fraction.

To design a heat exchanger properly, it is necessary to know in advance actual gas cold and hot fraction temperatures $T_1$ and $T_2$ at the desirable magnitude of the vortex tube's cold fraction value.

These gas temperatures are customarily expressed as follows: $T_1 = T_0 - \Delta T_1$ and $T_2 = T_0 + \Delta T_2$, and $T_0$ is an inlet gas temperature, $\Delta T_1$ and $\Delta T_2$ are a "cold" gas and "hot" gas temperature differences, respectively; in other words—a vortex tube's performance efficiency under current values of it's operational parameters. To determine a vortex tube's efficiency, one, for instance, may use the teachings in an article entitled: "A Similarity Relation For Energy Separation In A Vortex Tube" by K. Stephan, S. Lin, M. Durst, F. Huang and D. Seher and available from the New York Public Library in New York City, N.Y. This article provides an explanation of the operation of a vortex tube and the method of the vortex tube performance calculation.

Having determined an actual gas cold and hot fraction temperatures as well as knowing it's inlet temperature and flow rate values, a heat exchanger with the desirable efficiency can be designed by selecting appropriate heat exchanger components, such as passage 24, diaphragm 18, etc., and its material and geometry.

It should be understood that in a conventional range of the vortex tube's temperature differences, it is possible to design a heat exchanger provided both, a sufficient heating of the vortex tube's diaphragm surface and still low/high actual temperatures of the vortex cold and hot fractions leaving a non-freezing vortex tube through outlet openings, 30 and 32, respectively.

Figure 2:
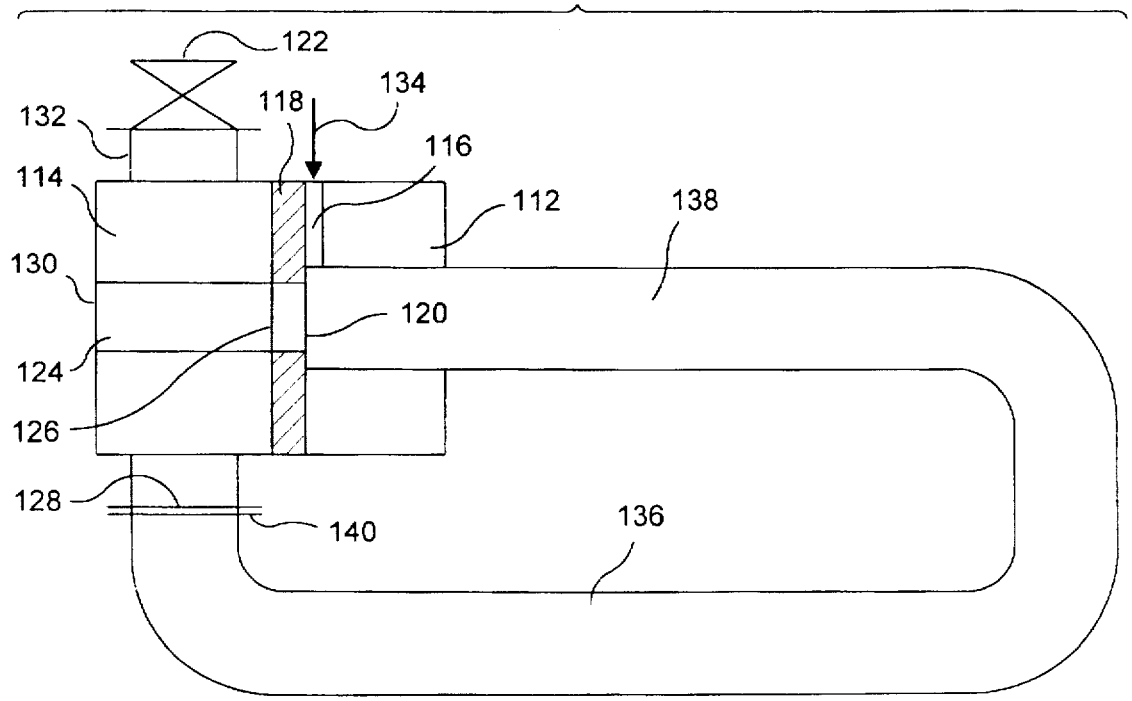
FIG. 2 is a schematic design and flow diagram of another embodiment of the invention.

In some vortex tube's applications, it is important to maintain at the throttle discharge a certain high hot fraction flow velocity for further utilization. To fulfill this requirement, another embodiment of the present invention is shown in FIG. 2. In this embodiment, parts similar to the parts in FIG. 1 have been raised by 100. As shown on the schematic design and flow diagram of FIG. 2, a non-freezing vortex tube assembly 50 according to the invention includes a vortex tube 112 with an inlet nozzle 116, diaphragm 118 with a central hole 120, a slender tube 138 and throttle 122 at outlet 132 to regulate a cold and hot fraction split value, a line 136 extending directly from slender tube 138 with outlet 140, a heat exchanger 115 with an inner passage 124, two inlet openings 126 and 128, transverse or substantially orthogonally disposed relative to each other and two outlet openings 130 and 132, transverse or substantially orthogonally disposed relative to each other. Openings 126 and 130 also serve as the inner passage's 124 inlet and outlet, respectively.

Inlet opening 126, central hole 120 and outlet opening 130 as shown all lie along a first common axis. Inlet opening 128 and outlet opening 132 as shown also lie along a second common axis transverse to the first common axis, but as noted heretofore in connection with FIG. 1, can be at any angular relationship.

The main feature of the described embodiment of FIG. 2, which secures a requirement on the hot flow high velocity consists in the placement of the throttle 122 at the heat exchanger's outlet opening 132.

In some cases in order to cover a desirable inlet flow rate, it is more expedient to use two vortex tubes instead of one. Under such circumstances another embodiment of the present invention may be successfully used.

Figure 3:
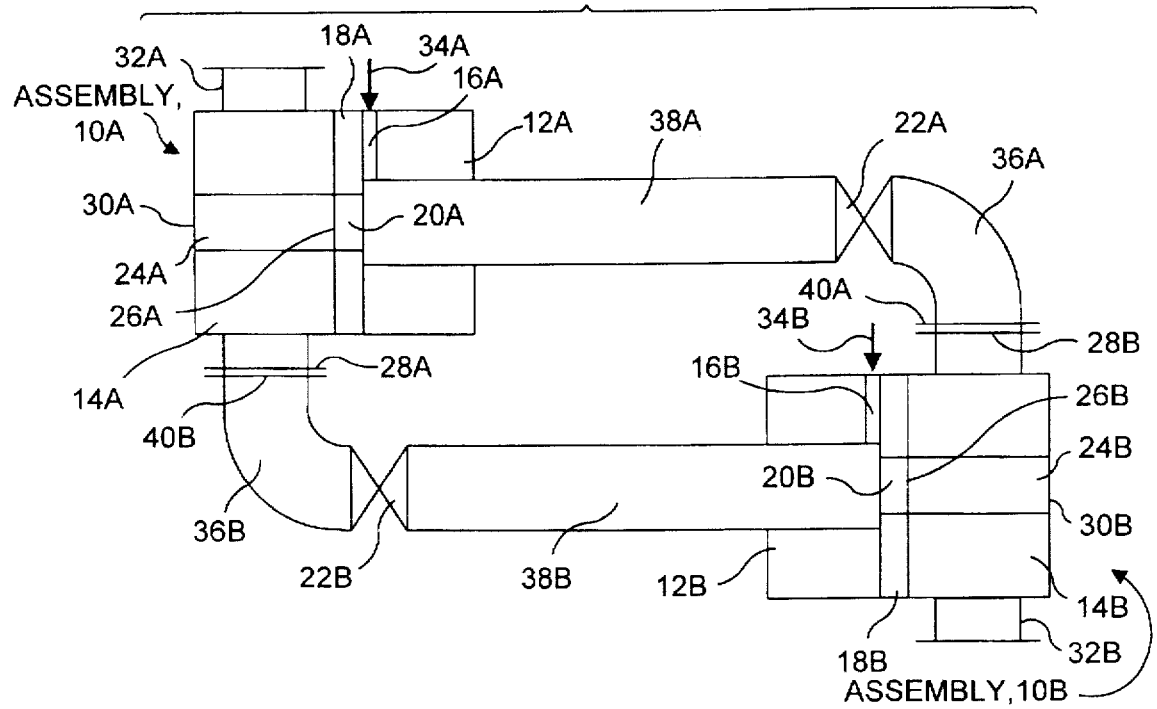
FIG. 3 is a schematic design and flow diagram of another embodiment of the invention.

As is shown on the schematic design and flow diagram in FIG. 3, a non-freezing vortex tube arrangement 101 according to the invention includes two vortex tube assemblies 10A and 10B.

Specifically, assembly 10A includes a vortex tube 12A with an inlet nozzle 16A, diaphragm 18A provided with a central hole 20A and throttle 22A in a manner similar to FIG. 1 at the far end of the slender tube 38A, a heat exchanger 14A with an inner passage 24A, two inlet openings 26A and 28A and two outlet openings 30A and 32A. Openings 26A and 30A also serve as the inner passage's 24 A inlet and outlet, respectively.

Assembly 10B includes a vortex tube 12B with an inlet nozzle 16B, diaphragm 18B provided with a central hole 20B and a throttle 22B in a manner similar to FIG. 1 at the far end of the slender tube 38B, a heat exchanger 14B with an inner passage 24B, two inlet openings 26B and 28B and two outlet openings 30B and 32B. Openings 26B and 30B also serve as the inner passage's 24 inlet and outlet, respectively.

A gas flow 34A enters into assembly 10A through the vortex tube's nozzle 16A and then undergoes an energy (temperature) separation, forming cold and hot fractions. A gas flow 34B enters into assembly 10B through the vortex tube's nozzle 16B and then undergoes an energy (temperature) separation, forming cold and hot fractions.

A cold fraction discharged from vortex tube 12A through diaphragm hole 20A enters heat exchanger's 14A inlet opening 26A, then goes through passage 24A and leaves heat exchanger 14A through its outlet opening 30A. A hot fraction discharged from the throttle 22A is then directed through line 36A. And, in a similar manner, a cold fraction discharged from vortex tube 12B through diaphragm hole 20B enters the heat exchanger's 14B inlet opening 26B, then goes through passage 24B and leaves the heat exchanger 14B through its outlet opening 30B. A hot fraction discharged from the throttle 22B is then directed through line 36B.

After passing line 36A and outlet 40A, a hot fraction then enters heat exchanger 14B through an inlet opening 28B, goes to opening 32B simultaneously flowing over the inside of heat exchanger's 14B surfaces and then leaves the heat exchanger through outlet opening 32B.

Simultaneously, after passing line 36B and outlet 40B, a hot fraction then enters heat exchanger 14A through inlet opening 28A, goes to outlet opening 32A simultaneously flowing over the inside of heat exchanger's 14A surfaces and then leaves heat exchanger 14A through outlet opening 32A.

In cases when there are two vortex tubes in operation, each with the requirement on the high velocity for the hot flow discharged from the throttle, another embodiment of the present invention (see FIG. 4) may be successfully used.

Figure 4:
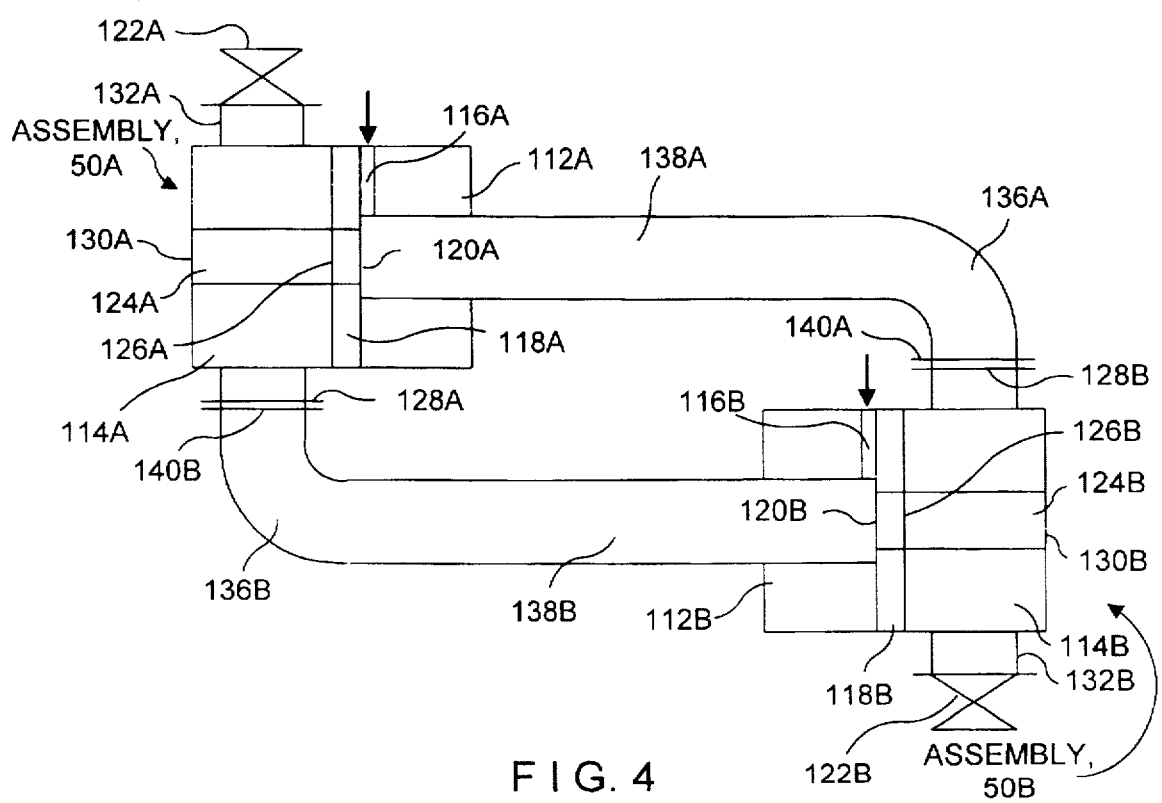
FIG. 4 is a schematic design and flow diagram of another embodiment of the invention.

As is shown on the schematic design and flow diagram of FIG. 4 a non-freezing vortex tube arrangement 501 according to the invention includes two vortex tube assemblies 50A and 50B.

Assembly 50A includes vortex tube 112A with an inlet nozzle 116A, diaphragm 118A with a central hole 120A, a slender tube 138A and a throttle 122A, heat exchanger 114A provided with an inner passage 124A, two inlet openings 126A and 128A, and two outlet openings 130A and 132A; the outlet opening 132A is connected with throttle 122A. Openings 126A and 130A also serve as the inner passage's 124A inlet and outlet openings, respectively.

Assembly 50B includes a vortex tube 112B with an inlet nozzle 116B, diaphragm 118B with a central hole 120B, a slender tube 138B and a throttle 122B, a heat exchanger 114B with an inner passage 124B, two inlet openings 126B and 128B, and two outlet openings 130B and 132B; and outlet opening 132B is connected with throttle 122B. Openings 126B and 130B also serve as the inner passage's 124B inlet and outlet openings respectively.

The main feature of the described embodiment in FIG. 4 consists in connection of the far end of the slender tube 138A through line 136A and outlet 140A directly with the inlet opening 128B of heat exchanger 114B and, accordingly, connection of the far end of the slender tube 138B through line 136B and outlet 140B directly with inlet opening 128A of heat exchanger 114A.

In the usage of the vortex tube operations, a hot fraction flow may have temperatures high enough to warm a diaphragm without the use of the conventionally designed heat exchanger. Also, an amount of heat to be transferred to the diaphragm may not require such a heat exchanger.

An embodiment suitable for such conditions is shown in the schematic design and flow diagram of FIG. 5. In this embodiment, parts similar to the parts in FIG. 1 have been raised by 200.

As is shown in FIG. 5, a non-freezing vortex tube assembly 60 according to the invention includes a vortex tube 212 having an inlet nozzle 216, diaphragm 218 provided with a central hole 220 and passage 224 on the outward side of the diaphragm to prevent a vortex cold and hot fraction mix up and a throttle 222 at the far end of a slender tube 238.

A gas flow enters assembly 60 in the direction of arrow 234 through one or more tangential nozzles 216 of vortex tube 212 and then undergoes an energy (temperature) separation, forming cold and hot fractions.

A cold fractions is discharged from vortex tube 212 through a diaphragm hole 220, which also serves as an inlet to passage 224, then goes through passage 224 and leaves it through outlet opening 230 of passage 224. A vortex hot fraction is discharged from the throttle 222 which is connected to the far end of slender tube 238 and is directed through a line 236 and line's opening 240 to the diaphragm surface. Then after flowing over the diaphragm surfaces a hot flow mixes up with an ambient air.

In cases when there are two vortex tubes in operation, each without the use of a conventionally designed heat exchanger, another embodiment of the present invention, such as that shown in FIG. 6 may be successfully used. As best seen in FIG. 6, a non-freezing vortex tube arrangement 601 according to the invention includes two vortex tube assemblies 60A and 60B.

Assembly 60A includes a vortex tube 212A with an inlet nozzle 216A, diaphragm 218A provided with a central hole 220A and a passage 224A on the outward side of diaphragm 218A and a throttle 222A at the far end of slender tube 238A.

Assembly 60B includes vortex tube 212B with an inlet 216B, diaphragm 218B provided with a central hole 220B and a passage 224B on the outward side of the diaphragm 218B and a throttle 222B at the far end of slender tube 238B.

A gas flow 234A enters assembly 60A through the vortex tube's nozzles 216A and then undergoes an energy (temperature) separation, forming a cold and a hot fraction. In similar manner, a gas flow 234B enters assembly 60B through the vortex tube's 216B and then undergoes an energy (temperature) separation, forming a cold and a hot fraction.

A cold fraction discharged from the vortex tube 212A through a diaphragm hole 220A, which also serves as an inlet to a passage 224A, then goes through passage 224A and leaves it through outlet opening 230A of passage 224A. A hot fraction discharged from throttle 222A is directed through line 236A and a line's outlet 240A to a diaphragm 218B surface. Then after flowing over the diaphragm surface the hot flow mixes up with the ambient air.

A cold fraction discharged from vortex tube 212B through diaphragm hole 220B, which also serves as an inlet to passage 224B, then foes through passage 224B and leaves it through outlet opening 230B of passage 224B. A hot fraction discharged from the throttle 222B is directed through a line 236B and line's outlet 240B to the diaphragm 218A surface. Then after flowing over the diaphragm surface the hot flow mixes up with the ambient air.

Figure 7:
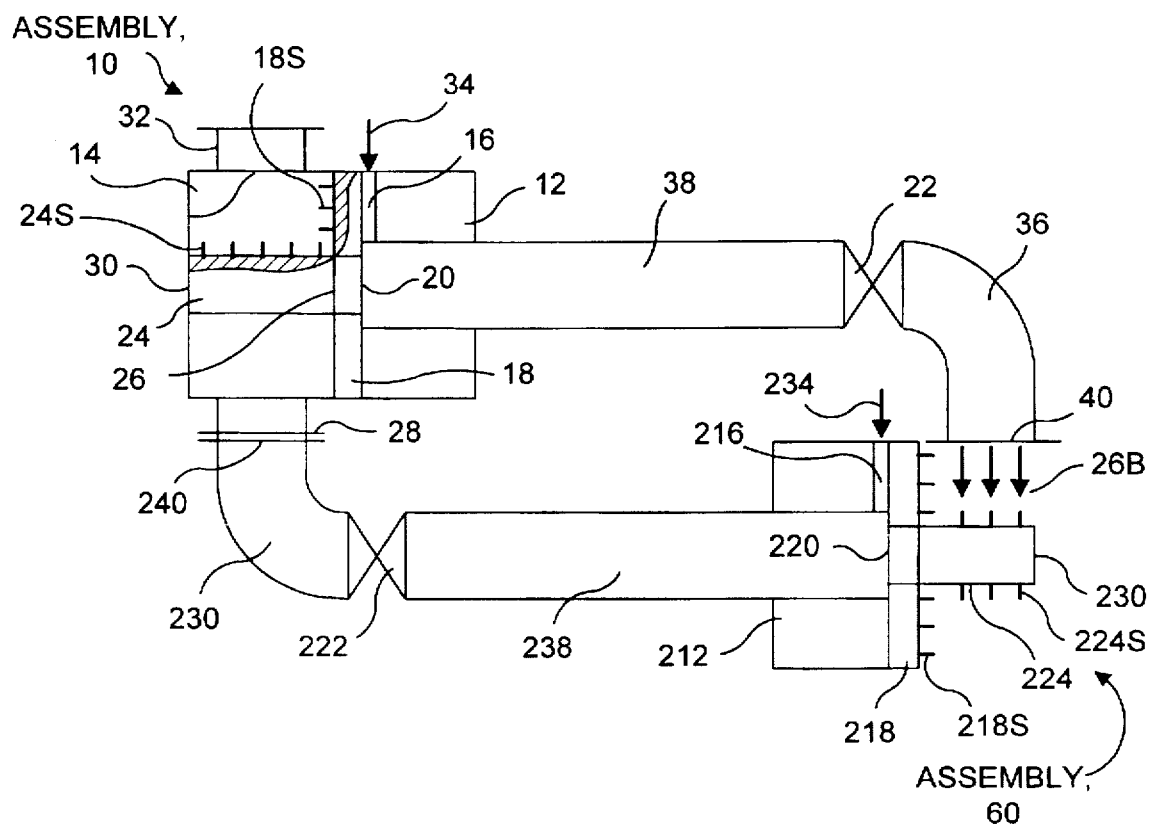
FIG. 7 is a schematic design and flow diagram of another embodiment of the invention.

Another embodiment of the present invention reflecting cases when there are two differently designed Vortex Tubes in operation is shown in FIG. 7.

Referring now more particularly to FIG. 7 which shows a non-freezing vortex tube arrangement 700 and includes a vortex tube assembly 10 according to the schematic design and flow diagram of FIG. 1 and a vortex tube assembly 60 according to the schematic design and flow diagram of FIG. 5.

The non-freezing vortex tube arrangement 700 is distinguished by connecting line's 236 outlet 240 with a single heat exchanger's 14 inlet opening 28 and directing line's 36 outlet 40 to the diaphragm 218 surface.

As seen in FIG. 7, the outward surface of diaphragm 18 and 218 preferably bear supplemental surfaces 18S and 218S, respectively to increase a heat transfer efficiency. And, in a similar manner, the heat exchanger's inner passage 24 external surface and the passage 224 external surface may preferably bear supplemental surfaces 24S and 224S, respectively. In the other embodiments, the outward surface of the diaphragm and the external surface of the inner passage and/or passage may bear supplemental surfaces to increase the heat transfer efficiency.

While there has been shown and described what is considered to be the preferred embodiments of the invention, various changes and modifications may be made therein without departing from the scope of the invention.

What is claimed is:

1. A method for a non-freezing vortex tube to operate with non-dried even wet inlet gas flow in a broad range of a vortex tube's cold fraction value, said non-freezing vortex tube including a heat exchanger and a vortex tube comprising a slender tube, a diaphragm having a hole in the center thereof and closing one end of the slender tube, one or more tangential nozzles piercing the slender tube just inside the diaphragm and a throttle on the other end of the slender tube, the method comprising ways of connecting the non-freezing vortex tube as follows:

a) attaching a heat exchanger to an outward side of a vortex tube's diaphragm;

b) connecting a vortex tube's diaphragm hole for discharging a cold fraction flow with a heat exchanger's inlet opening and then connecting the inlet opening through a heat exchanger's inner passage with a heat exchanger's outlet openings to discharge a cold fraction flow from the non-freezing vortex tube; and c) connecting a vortex tube throttle at the far end of the slender tube with another heat exchanger's inlet opening, thus providing for the hot flow discharged from the vortex tube to heat up the vortex tube's diaphragm and then directing the hot flow to the another heat exchanger's outlet opening to leave the non-freezing vortex tube.

2. The method of claim 1, wherein the vortex tube's diaphragm outward surface and the heat exchanger's inner passage external surface are equipped with at least one supplemental surface.

3. A method of a non-freezing vortex tube to operate with non-dried even wet inlet gas flow in a broad range of a vortex tube's cold fraction value, said non-freezing vortex tube includes a heat exchanger and a vortex tube comprising a slender tube, a diaphragm closing one end of the slender tube having a hole in the center thereof, at least one tangential nozzle piercing the slender tube just inside the diaphragm and a throttle, the method comprising ways of connecting the non-freezing vortex tube as a follows:

a) attaching a heat exchanger to an outward side of a vortex tube's diaphragm;

b) connecting a vortex tube's diaphragm hole for discharging a cold fraction flow with a heat exchanger's inlet opening and then connecting the opening through a heat exchanger's inner passage with a heat exchanger's outlet opening to discharge a cold fraction flow from the non-freezing vortex tube; and c) connecting a far end of the vortex tube's slender tube with another heat exchanger's inlet opening, thus providing for a hot flow to heat up the vortex tube's diaphragm and then directing the hot flow to another heat exchanger's outlet opening and further to the vortex tube's throttle connected with the last-mentioned outlet opening to leave the non-freezing vortex tube.

4. The method of claim 3, wherein the vortex tube's diaphragm outward surface and the heat exchanger's inner passage external surface are equipped with at least one supplemental surface.

5. A method for a non-freezing vortex tube arrangement to operate with non-dried even wet inlet gas flow in a broad range of a vortex tube's cold fraction value, said non-freezing vortex tube arrangement including two heat exchangers and two vortex tubes each comprising a slender tube, a diaphragm closing one end of the slender tube having a hole in the center thereof, one or more tangential nozzles piercing each of the slender tubes just inside the diaphragm and a throttle on the other end of the slender tube, the method comprising ways of connecting the non-freezing vortex tube arrangement as follows:

a) attaching a first heat exchanger to an outward side of a first vortex tube's diaphragm, thus forming a first vortex tube assembly;

b) attaching a second heat exchanger to an outward side of a second vortex tube's diaphragm, thus forming a second vortex tube assembly;

c) connecting the first vortex tube's diaphragm hole for discharging a cold fraction flow with the first heat exchanger's first inlet opening and then connecting the first inlet opening of the first heat exchanger through the first heat exchanger's inner passage with the first heat exchanger's first outlet opening to discharge a cold fraction flow from the non-freezing vortex tube arrangement;

d) connecting the second vortex tube's diaphragm hole for discharging the cold fraction flow with the second heat exchanger's first inlet opening and then connecting the first inlet opening of the second heat exchanger's first outlet opening to discharge the cold fraction flow from the non-freezing vortex tube arrangement; and e) connecting the first vortex tube's throttle at the far end of the first vortex tube's slender tube with the second heat exchanger's second inlet opening of the second vortex tube assembly, thus providing for the hot flow discharged from the first vortex tube to heat up the second assembly's vortex tube diaphragm and then directing the hot flow to the second heat exchanger's second outlet opening to leave the non-freezing vortex tube arrangement;

f) connecting the second vortex tube throttle at the far end of the second vortex tube's slender tube with the first heat exchanger's second inlet opening of the first vortex tube assembly, thus providing for the hot flow discharged from the second vortex tube to heat up the first assembly's vortex tube diaphragm and then directing the hot flow to the first heat exchanger's second outlet opening to leave the non-freezing vortex tube arrangement.

6. The method of claim 5 wherein at least one of the vortex tube's diaphragm outward surface and at least one of the heat exchanger's inner passage external surface are equipped with at least one supplemental surface.

7. The method of claim 5 wherein the axes of the two assemblies are aligned under any angle.

8. A method for a non-freezing vortex tube arrangement to operate with non-dried even wet inlet gas flow in a broad range of a vortex tube's cold fraction value, said non-freezing vortex tube arrangement includes two heat exchangers and two vortex tubes each comprising a slender tube, a diaphragm closing one end of each of the slender tubes having a hole in the center thereof, one or more tangential nozzles piercing each of the slender tubes just inside the diaphragm and a throttle for each of said vortex tubes, the method comprising ways of connecting the non-freezing vortex tube arrangement as follows:

a) attaching a first heat exchanger to an outward side of a first vortex tube's diaphragm, thus forming a first vortex tube assembly;

b) attaching a second heat exchanger to an outward side of a second vortex tube's diaphragm, thus forming a second vortex tube assembly;

c) connecting the first vortex tube's diaphragm hole for discharging a cold fraction flow with the first heat exchanger's first inlet opening and then connecting the first inlet opening of the first heat exchanger through the first heat exchanger's inner passage with the first heat exchanger's first outlet openings to discharge a cold fraction flow from the non-freezing vortex tube arrangement;

d) connecting the second vortex tube's diaphragm hole for discharging a cold fraction flow with the second heat exchanger's first inlet opening and then connecting the first inlet opening of the second heat exchanger through the second heat exchanger's inner passage with the second heat exchanger's first outlet opening to discharge a cold fraction flow from the non-freezing vortex tube arrangement;

e) connecting a far end of the first vortex tube's slender tube with the second heat exchanger's second inlet opening of the second vortex tube assembly, thus providing for the hot flow discharged from the first vortex tube to heat up the second assembly's vortex tube diaphragm and the directing the hot flow to the second heat exchanger's second outlet opening and further to the second throttle connected with the second outlet opening of the second heat exchanger to leave the non-freezing vortex tube arrangement; and f) connecting a far end of the second vortex tube's slender tube with the first heat exchanger's second inlet opening of the first vortex tube assembly, thus providing for the hot flow discharged from the second vortex tube to heat up the first assembly's vortex tube diaphragm and then directing the hot flow to the first heat exchanger's second outlet opening and further to the first throttle connected with the second outlet opening of the first heat exchanger to leave the non-freezing vortex tube arrangement.

9. The method of claim 8, wherein at least one of the first and second vortex tube's diaphragm outward surface and at least one of the first and second heat exchanger's inner passage external surface are equipped with at least one supplemental surface.

10. The method of claim 8, wherein the axes of the two assemblies are aligned under any angle.

11. A method for a non-freezing vortex tube to operate with non-dried, even inlet gas flow in a broad range of a vortex tube's cold fraction value, said non-freezing vortex tube consists of a vortex tube comprising a slender tube, a diaphragm closing one end of the slender tube having a hole in the center thereof and a passage on it's outward side, one or more tangential nozzles piercing the slender tube just inside the diaphragm and a throttle on the other end of the slender tube, the method comprising the ways of connecting the non-freezing vortex tube as follow:

a) discharging a cold fraction flow from the non-freezing vortex tube through a passage outlet opening connected through a passage inlet opening with a vortex tube's diaphragm hole; and b) connecting a vortex tube throttle at the far end of the slender tube with a line's inlet opening and discharging a hot fraction flow to the vortex tube's diaphragm surface through a line's outlet opening.

12. The method of claim 11, wherein the vortex tubes's diaphragm outward surface and the passage's external surface are equipped with at least one supplemental surface.

13. A method for a non-freezing vortex tube arrangement to operate with non-dried even wet inlet gas flow in a broad range of a vortex tube's cold fraction value, said non-freezing vortex tube arrangement including first and second vortex tube assemblies each comprising a slender tube, a diaphragm closing one end of each of the slender tubes and having a hole in the center thereof and a passage on its outward side, one or more tangential nozzles piercing each of said slender tubes just outside the diaphragm and a throttle on the other end of each of said slender tubes, the design comprising the ways of connecting the non-freezing vortex tube arrangement as follows:

a) discharging a cold fraction flow from the non-freezing vortex tube arrangement through a first passage associated with the first vortex tube through said first passage outlet opening connected through an inlet opening associated with said first passage to the first vortex tube's diaphragm hole;

b) connecting a first vortex tube throttle at the far end of the first vortex tube's slender tube with a first line's inlet opening and discharging a hot fraction flow to the second vortex tube's diaphragm surface through the first line's outlet opening;

c) discharging a cold fraction flow from the non-freezing vortex tube arrangement through a second passage associated with the second vortex tube through said second passage outlet opening connected through an inlet opening associated with said second passage to the second vortex tube's diaphragm hole; and d) connecting a second vortex tube throttle at the far end of the second vortex tube's slender tube with a second line's inlet opening and discharging a hot fraction flow to the first vortex tube's diaphragm surface through the second line's outlet opening.

14. The method of claim 13 wherein at least one of the first and second vortex tube's diaphragm outward surface and at least one of the first and second passage's external surface is equipped with at least one supplemental surface.

15. The method of claim 13 wherein the axes of two vortex tubes are aligned under any angle.

16. A method for non-freezing vortex tube arrangement to operate with non-dried even wet inlet gas flow in a broad range of a vortex tube's cold fraction value, said non-freezing tube arrangement includes a heat exchanger and first and second vortex tubes, the first vortex tube comprising a first slender tube and a first diaphragm, the second vortex tube comprising a second slender tube and a second diaphragm, and the first diaphragm closing one end of the first slender tube having a hole in the center thereof, the second diaphragm closing one end of the second slender tube having a hole in the center thereof, one or more tangential nozzles piercing each of said first and second slender tubes just outside the diaphragms and a throttle on the other end of each of the first and second slender tubes, the first vortex tube additionally includes a passage on its outward side thus providing a first vortex tube assembly, the method comprising the ways of connecting the non-freezing vortex tube arrangement as follow:

c) attaching the heat exchanger to an outward side of the second vortex tube's diaphragm, thus forming a second vortex tube assembly;

b) discharging a cold fraction flow from the non-freezing vortex tube arrangement through the first vortex tube's passage outlet opening connected through a passage inlet opening with the first vortex tube's diaphragm hole;

c) connecting the second vortex tube's diaphragm hole for discharging a cold fraction flow with the heat exchanger's first inlet opening and then connecting the inlet opening through the heat exchanger's inner passage with the heat exchanger's outlet opening to discharge a cold fraction flow from the non-freezing vortex tube arrangement;

d) connecting the first vortex tube's throttle at the far end of said first slender tube with the heat exchanger's another inlet opening of the second vortex tube assembly, thus providing for the hot flow discharged from the first vortex tube to heat up the second assembly's vortex tube diaphragm and then directing the hot flow to the heat exchanger's other outlet opening to leave the non-freezing vortex tube arrangement; and e) connecting the second vortex tube's throttle at the far end of said second slender tube with a line's inlet opening and discharging a hot flow to the first vortex tube's diaphragm surface through the line's outlet opening.

17. The method of claim 16 wherein at least one of the first and second vortex tube's diaphragm outward surface and the heat exchanger's inner passage external surface are equipped with at least one supplemental surface.

18. The method of claim 16, wherein the axes of the assemblies and the second vortex tube are aligned under any angle.

19. A method for a non-freezing vortex tube to operate with non-dried even wet inlet gas flow in a broad range of a vortex tube's cold fraction value, said non-freezing vortex tube includes a heat exchanger and vortex tube comprising a slender tube, a diaphragm closing one end of the slender tube having a hole in the center thereof, at least one tangential nozzle piercing the slender tube just inside the diaphragm and a throttle, the method comprising ways of connecting the non-freezing vortex tube as follows:

a) attaching a heat exchanger to an outward side of a vortex tube's diaphragm;

b) connecting a vortex tube's diaphragm hole for discharging a cold fraction flow with a heat exchanger's inlet opening and then connecting the opening through a heat exchanger's inner passage with a heat exchanger's outlet opening to discharge a gas flow from the non-freezing vortex tube; and c) connecting a far end of the vortex tube's slender tube with another heat exchanger's inlet opening while maintaining the vortex tube's throttle connected with another heat exchanger's outlet opening closed, thus causing a hot flow circulation, thus providing for a hot flow to heat up the vortex tube's diaphragm on its way out of the slender tube and provides for a hot flow to mix up with the cold fraction on its way back to the slender tube's center.

20. The method of claim 19, wherein the vortex tube's diaphragm outward surface and the heat exchanger's inner passage external surface are equipped with at least one supplement surface.

21. A method for a non-freezing vortex tube arrangement to operate with non-dried even wet inlet gas flow in a broad range of a vortex tube's cold fraction value, said non-freezing vortex tube arrangement includes two heat exchangers and two vortex tubes each comprising a slender tube, a diaphragm closing one end of each of the slender tubes having a hole in the center thereof, one or more tangential nozzles piercing each of the slender tubes just inside the diaphragm and a throttle for each of said vortex tubes, the method comprising ways of connecting the non-freezing vortex tube arrangement as follows:

a) attaching a first heat exchanger to an outward side of a first vortex tube's diaphragm, thus forming a first vortex tube assembly;

b) attaching a second heat exchanger to an outward side of a second vortex tube's diaphragm, thus forming a second vortex tube assembly;

c) connecting the first vortex tube's diaphragm hole for discharging a cold fraction flow with the first heat exchanger's first inlet opening and then connecting the first inlet opening of the first heat exchanger through the first heat exchanger's inner passage with the first heat exchanger's first outlet openings to discharge a gas flow from the non-freezing vortex tube arrangement;

d) connecting the second vortex tube's diaphragm hole for discharging a cold fraction flow with the second heat exchanger's first inlet opening and then connecting the first inlet opening of the second heat exchanger through the second heat exchanger's inner passage with the second heat exchanger's first outlet opening to discharge a gas flow from the non-freezing vortex tube arrangement;

e) connecting a far end of the first vortex tube's slender tube with the second heat exchanger's second inlet opening of the second vortex tube assembly while maintaining the first vortex tube's throttle connected with the second outlet opening of the second heat exchanger closed, thus causing a first vortex tube's hot flow circulation providing for the hot flow to heat up the second assembly's vortex tube diaphragm on its way out of the first vortex tube's slender tube and providing for a hot flow to mix up with the first vortex tube's cold fraction on its way back to the first vortex tube's slender tube; and f) connecting a far end of the second vortex tube's slender tube with the first heat exchanger's second inlet opening of the first vortex tube assembly while maintaining the second vortex tube's throttle connected with the second outlet opening of the first heat exchanger closed, thus causing a second vortex tube's hot flow circulation providing for the hot flow to heat up the first assembly's vortex tube diaphragm on its way out of the second vortex tube's slender and providing for a hot flow to mix up with the second vortex tube's cold fraction on its way back to the second vortex tube's slender tube.

22. The method of claim 21, wherein at least one of the first and second vortex tube's diaphragm outward surface and at least one of the first and second heat exchanger's inner passage external surface are equipped with at least one supplemental surface.

23. The method of claim 21, wherein the axes of the two assemblies are aligned under any angle.

\* \* \* \* \*